US006931418B1

(12) United States Patent
Barnes

(10) Patent No.: US 6,931,418 B1
(45) Date of Patent: Aug. 16, 2005

(54) METHOD AND SYSTEM FOR PARTIAL-ORDER ANALYSIS OF MULTI-DIMENSIONAL DATA

(76) Inventor: Steven M. Barnes, 155 Caymus Ct., Sunnyvale, CA (US) 94086

( * ) Notice: Subject to any disclaimer, the term of this patent is extended or adjusted under 35 U.S.C. 154(b) by 392 days.

(21) Appl. No.: 10/106,467

(22) Filed: Mar. 26, 2002

Related U.S. Application Data

(60) Provisional application No. 60/279,000, filed on Mar. 26, 2001.

(51) Int. Cl.[7] .............................................. G06F 17/30
(52) U.S. Cl. ............................ 707/103; 707/3; 707/10; 707/101; 707/102; 707/104; 707/5; 707/6
(58) Field of Search .............................. 707/3, 10, 100, 707/5, 6, 101, 102, 103, 104

(56) References Cited

U.S. PATENT DOCUMENTS

| | | | |
|---|---|---|---|
| 5,257,365 A | 10/1993 | Powers et al. | |
| 5,359,724 A | 10/1994 | Earle | |
| 5,511,190 A | 4/1996 | Sharma et al. | |
| 5,799,300 A | 8/1998 | Agrawal et al. | |
| 5,822,751 A | 10/1998 | Gray et al. | |
| 5,890,151 A | 3/1999 | Agrawal et al. | |
| 5,978,788 A | 11/1999 | Castelli et al. | |
| 5,999,192 A * | 12/1999 | Selfridge et al. | 345/440 |
| 6,003,036 A | 12/1999 | Martin | |
| 6,055,529 A | 4/2000 | Furlani | |
| 6,134,541 A | 10/2000 | Castelli et al. | |
| 6,154,746 A | 11/2000 | Berchtold et al. | |
| 6,205,447 B1 | 3/2001 | Malloy | |
| 6,212,515 B1 | 4/2001 | Rogers | |
| 6,275,818 B1 * | 8/2001 | Subramanian et al. | 707/2 |
| 6,278,977 B1 * | 8/2001 | Agrawal et al. | 705/7 |
| 6,289,352 B1 | 9/2001 | Proctor | |
| 6,321,379 B1 * | 11/2001 | Callahan, II | 717/141 |
| 6,424,967 B1 | 7/2002 | Johnson et al. | |
| 6,487,546 B1 | 11/2002 | Witkowski | |
| 6,684,207 B1 * | 1/2004 | Greenfield et al. | 707/3 |
| 6,728,728 B2 * | 4/2004 | Spiegler et al. | 707/103 R |
| 2002/0194167 A1 * | 12/2002 | Bakalash et al. | 707/3 |
| 2003/0018642 A1 * | 1/2003 | Bakalash et al. | 707/10 |
| 2003/0023608 A1 * | 1/2003 | Egilsson et al. | 707/100 |
| 2003/0220926 A1 * | 11/2003 | Huelsman et al. | 707/100 |

OTHER PUBLICATIONS

Gendrano et al., "Parallel Algorithms for Computing Temporal Aggregates", IEEE, 1999, pp. 418–427.*
Albrecht et al., "Management of Multidimensional Aggregates for Efficient Online Analytical Processing", IEEE, 1999, pp. 156–164.*
Donald Knuth, The Art of Computer Programming, vol. 1, pp. 258–265, 1968, Addison–Wesley.
Robert Levinson, A Self Organizing Retrieval System for Graphs, TR #AI–85–05, 1985, Univ. of Texas, Austin.
S. Myaeng & C. Khoo, On Uncertainty Handling in Plausible Reasoning with Conceptual Graphs, Conceptual Structures: Current Research & Practice, 1992, Ellis Horwood, Ltd.
Methods and Problems in Data Mining, Heikki Mannila, Proc. Intl. Conf. on Database Theory, Jan. 1997, Springer–Verlag.
APB–1 OLAP Benchmark, Release 2, OLAP Council, Nov. 1998, pp. 1–13, http://www.olapcouncil.org/research/bmarkly.htm.

(Continued)

Primary Examiner—Thuy N. Pardo

(57) ABSTRACT

A method and system for performing data analysis where multiple, categorical dimensions and statistical measures are used. The method includes preparing multi-dimensional data into nodes and arranging them logically in the form of a partial-order database. The database may then be traversed by a data-mining tool, or queried in an OLAP manner. Queries are answered through a process of associative partial-order search, which includes optional support for "children-of" requests, and optional support for fuzzy pattern-matching. By aggregating measures on-the-fly, this method is able to preform well without requiring a large number of summary nodes, when taken as a percentage of the total node count.

10 Claims, 9 Drawing Sheets

OTHER PUBLICATIONS

Steven Geffner et al., The Dynamic Data Cube, EDBT 2000, LNCS 1777, pp. 237–253, 2000, Springer–Verlag.

Steven Barnes, A Partially–Ordered Associative Container, Master Thesis, Mar. 2001, Univ. of Calif., Santa Cruz, pp. 34–41 (Chapter 4).

* cited by examiner

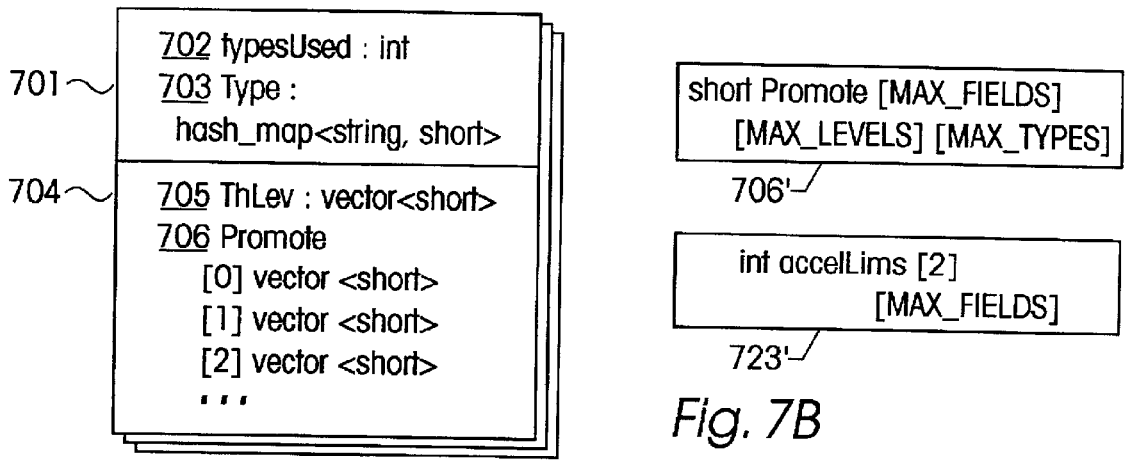
Fig. 7A
Fig. 7B
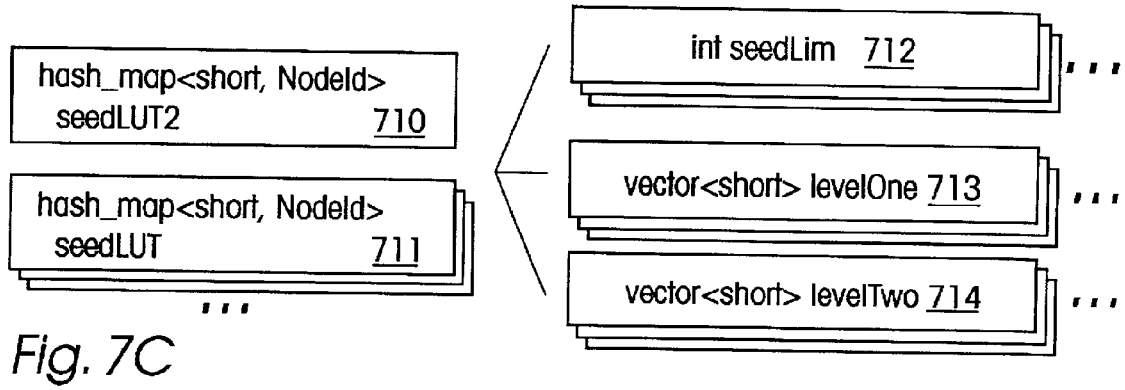
Fig. 7C
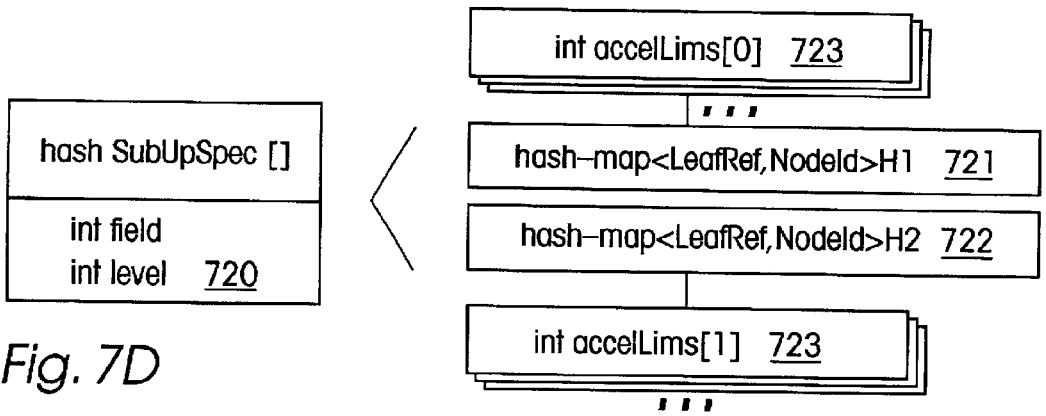
Fig. 7D

METHOD AND SYSTEM FOR PARTIAL-ORDER ANALYSIS OF MULTI-DIMENSIONAL DATA

CROSS-REFERENCE TO RELATED APPLICATION

This application claims the benefit of Provisional Patent Application Ser. No. 60/279,000 filed 2001 Mar. 26.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to computer databases, and in particular to an improved method and system for storing and retrieving data having multiple symbolic or categorical dimensions, through use of a partial-order to support data mining and OLAP queries.

2. Description of Relevant Art

To model data on a computer one needs a simple data structure; to model information one needs a more complex schema, or schematic, of the types of information one intends to store. In a business database, schemas tend to explicitly name all the data fields (organized into tables) and to describe relationships between sets of fields (tables). In an AI knowledge database one needs first an ontology, or hierarchy of types, and then a schema based more or less on frames. As explained by Marvin Minsky in 1975: "We can think of a frame as a network of nodes and relationships." Frames contain meta-information and also, at the lower level, slots to be filled with specific data instances. If one adds careful typing to the kinds of links which may exist between nodes, the result is a clearly defined semantic network such as was used in Ronald Brachman's KL-ONE project. Conceptual graphs are a fusion of semantic networks with a graphical form of logic developed by Charles Peirce at the end of the 19th century. CGs are suited to reasoning, especially reasoning with contexts.

The relational database model, introduced in 1970 by Ted Codd, is based on the notion that accuracy is best served by decomposing information into separate tables so that the only redundant data stored are keys. Most relationships exist only in potential, then, until a query is used to restore them via a JOIN operation. The mathematics for the model are formal and elegant, yet in practice the operations are computationally expensive, hence much effort is made to create and store indices to help speed them up. The model is not well-suited to handling whole-part or hierarchical relations and neither did SQL, its prevalent query language, support them well until recently.

A table may be viewed as a two-dimensional array, where one dimension distinguishes data records and the other selects different fields within a record. Fields may have a special value called "null" for cases where this datum is unknown or doesn't exist. Null values cause difficulties in both the formal relational model and in actual relational database systems. But in a pure CG database, not all graphs need be the same size, so null values do not appear to be a problem.

The multi-dimensional database (MDD), which provides the model or computational foundation upon which online analytical processing (OLAP) is based, derives from econometric research projects done at MIT in the 1960's. Its data structures store pre-computed statistical data to provide quick response for a real-time stream of queries from many simultaneous users. Typically these users are trying to make business decisions in areas such as marketing, budget analysis and quality control. In this model, data are broken into "meaures" (fields with quantitative, numerical values) and "dimensions" (fields with symbolic, categorical values). Arranging symbolic fields into the cross-tabular form seen in spreadsheets yields a 2-dimensional matrix from which charts may be plotted. One can also examine more than two dimensions—hence the term "data cube". Each dimension is associated with a type hierarchy: typically a tree with all leaves at the final level. Whether the underlying data source is relational or multi-dimensional, much research into efficient computation of the CUBE operator has been done.

A feature of an MDD system is the ability to aggregate or "roll up" data from lower dimensions when creating summarizations at the higher levels. An example would be a trends report that gave dollars revenue for State and Vehicle Class on a Quarter by Quarter sequence, even though the data elements are stored by Dealership, Model and Month. Whereas relational systems are designed to handle business transactions which continually update the database, MDD and OLAP systems are optimized for querying data which is updated only at infrequent intervals. Often an MDD system for business applications is loaded with de-normalized (pre-joined) data from a relational database.

OLAP systems generally take the approach of pre-computing summary data for all possible cubes. The effect is to limit the practical number of dimensions (symbolically-valued fields) to less than ten. Even with few dimensions, they must compress their cubes to save storage costs by using sparse-matrix techniques.

3. Details of Prior Art

An essential issue with cube methods, and related partitioning and indexing techniques, is the property called scalability. Many solutions which work well with, say, five dimensions in each of which are ten categories, would not do well if presented with a data set having twenty dimensions in each of which are one hundred categories. Therefore "combinatorial explosion" is a key factor in evaluating how well a method scales in terms of its execution time and memory requirements. Other factors which affect scaling are the number of data points stored, and their distribution (clustering). In the general field of analysis methods for multidimensional data with hierarchical categories, there are two main areas of focus. Data Mining seeks correlations inside a data set. Online Analytical Processing (OLAP) derives summations or other calculations from a data set according to a specific query submitted by a user or an automated report. When attempting to discover correlations or answer queries about multiple parameters (also called "measures" and "dimensions") in the data set, two fundamental techniques are useful:

1) the ability to quickly retrieve those nodes (data points) which are pertinent;
2) the ability to have some retrieving be from pre-computed summary nodes.

These techniques become more important as the size and complexity of the data grow. When a parameter takes on symbolic (categorical) values, complexity will increase sharply if the "types" associated with it belong to a multi-level hierarchy. When more of these parameters are added to the data, the number of distinct summary nodes possible increases exponentially, so care should be taken lest the cost of having summary nodes outweighs their benefit. The prior state of the art did not manage this trade-off well.

U.S. Pat. No. 5,359,724 (1994) to Earle provides access to sparse data by having a two-level index; one level has those dimensions which the user believes will result in dense data, and another level has those dimensions he believes will result in sparse data. The index for dense data trades wasted space for faster access, but any query that involves dimensions in the sparse index will incur a slower search. This compromise does little to assure efficiency, and what efficiency there is depends on information supplied by the user as to which dimensions are designated for faster indexing.

U.S. Pat. No. 5,511,190 (1996) to Sharma et al. improves performance of SQL queries involving groups, through use of a hash-based lookup for pre-computed partial aggregate data which may be combined to produce the answer. The amount of improvement claimed due to this hashing method is modest, and decreases as the number of groups included increases. Limitations include its reliance on an RDBMS and SQL, and its lack of support for hierarchical levels within columns.

Other methods, including those in U.S. Pat. No. 6,154,746 (2000) to Berchold et al., U.S. Pat. No. 6,003,036 (1999) to Martin, and U.S. Pat. No. 6,212,515 (2001) to Rogers, deal with partitioning data on secondary storage and do not pre-aggregate. The technique described in U.S. Pat. No. 5,890,151 (1999) to Agrawal et al., which uses covering codes to help retrieve pre-aggregated values for combining into the answer to a query, seems to have drawbacks in its scalability and flexibility.

Another type of analytical processing for multi-dimensional data is the operation called "clustering", which can group objects or data points according to their similarity (proximity in N-dimensional space). This can be used to return the "nearest neighbors", or most similar data records, in response to a query pattern, but is not well-suited for the hierarchical aggregation operations required for business data analysis. U.S. Pat. No. 6,134,541 (2000) to Castelli et al. describes such a system.

Although U.S. Pat. No. 5,978,788 (1999) to Castelli et al. describes a technique for generating data cubes capable of providing approximately correct answers using aggregation and OLAP data cubes, neither it nor any other of the techniques discussed so far claim to support hierarchical fuzzy pattern matching for answering aggregation queries. Nor do they offer a method to support aggregation where types in a categorical dimension exhibit the property of multiple inheritance. So many prior art techniques are inflexible in the sense that they are not easily adapted for fuzzy pattern matching, multiple inheritance, or the "children-of" function described in the following section.

More recent inventions include U.S. Pat. No. 6,487,546 (2002) to Witkowski which seems to ask, 'since a database system almost certainly has a B-tree index why not add a little aggregation data to it?' The answer is just as straight-forward: because it is generally of no use whatsoever in answering multi-dimensional OLAP queries. More significant is the work of Proctor (2001 U.S. Pat. No. 6,289,352) with his 'virtual storage rack', and of Bakalasb et al. (U.S. RPA 2002/0194167) with their segmented aggregation and 'slice-storage method.' Although these offer certain incremental advantages over the prior art, they are limited by the row/column mindset that comes out of the relational database tradition.

Johnson and Shasha in U.S. Pat. No. 6,424,967 (2002) take an alternative 'cube-forest' approach, but the benefits are limited due to their reliance on trees rather than DAGs (directed-acyclic graphs). In particular, they suggest the application must 'update-early-and-in-large-batches' due to the high cost for updates, which is also largely true of aforementioned methods including Agrawal (1999), Proctor (2001) and Bakalash. Fortunately, this is not true of the present invention which, unlike the prior art, teaches the use of partial-order indexing and traversal for high efficiency with sparse data. This method and its advantages are not obvious nor easily appreciated upon first reading. This is partly due to there being no prior use in this field of art, and partly due to the surprising benefits. Note also that the technique bears no direct correspondence to the relational database-owing more to multi-dimensional databases, Information Retrieval and mathematics (set theory).

Clarification of Terminology

A topologically-ordered search is a breadth-first search which is guaranteed to finish with all levels$\leq$k before comparing the key for any node at level k+1. (In this context, a node's level is its maximum path length from Top.) Associative retrieval uses a data pattern to search a database. Even if the query pattern has no duplicate in the database, retrieval may still occur once the pattern's proper position in the database is found. In the analytical field, the typical response is to return the specializations of that pattern. (That is, to return those data nodes which satisfy the query by being specific instances of it.) This is an essential point that prior art missed: given sparse multi-dimensional data, great efficiencies in time and space are achieved using associative search (in a unified partial-order data structure) combined with on-the-fly aggregation.

As an example, consider the following query loosely taken from the industry standard OLAP APB-1. Benchmark:

get UNITS SOLD, DOLLAR SALES, AVERAGE PRICE
  by PRODUCT="Truck Tires"
  by CUSTOMER="GM"
  by CHANNEL=attribute ("level", "TOP")
  by TIME="1995"

The same query translated into two different pattern forms could be:

Bare array form: Truck Tires, GM, Top, 1995
Concept graph form: Product: Truck Tires, Customer: GM, Time: 1995

These are both equivalent to the query above. But the actual query from the benchmark would have looked more like:

get UNITS SOLD, DOLLAR SALES, AVERAGE PRICE
  by PRODUCT=ChildrenOf ("Truck Tires")
  by CUSTOMER="GM"
  by CHANNEL=attribute ("level", "TOP")
  by TIME=ChildrenOf ("1995)

So instead of a single line of output data for units, dollars and average price, the query calls for M×N lines of output, where M is the number of product types in the hierarchy level directly below "Truck Tires", and N is the number of time types directly below "1995". For example, one line might read:

ATX 75R15 GM, Top, 95Q2, 2116, $53196.25, $25.14

This output line would represent the aggregation of many data points which might vary in each of the four dimensions, yet satisfy the description. For example, consider:

A: ATX 75R15, GM Plant#12, WarehouseA, 9505
B: ATX 75R15, GM Plant#18, WarehouseA, 9506

These patterns are both children of "ATX 75R15, GM, Top, 95Q2" yet A is incomparable to B. This is what we mean by a partial-order: that just because A is not strictly-less-than B and B is not strictly-less-than A, we cannot infer that A=B. (In a full-ordering we could make such an inference.) Formally, given a relation for preceeds, or strictly-less-than, a set is a partial-order if it satisfies three properties: transitivity, asymmetry and irreflexivity.

In a typical OLAP schema, each dimension has its own type hierarchy, usually in the form of a tree. A tree is a form of directed graph wherein no node can have more than one parent; that is, it always branches out, never joining back. The present invention is based on a data structure more suited to partial-orders: the directed-acyclic graph. If the root of each dimension's type hierarchy is called Top, then the root of our OLAP is the Top pattern, which consists of the Top value for each dimension. The data structure will consist of nodes each having a pattern part and a measures part, starting with the Top node and proceeding down through summary nodes and eventually terminating in leaf nodes. Each node is contained in the nodes above it, traceable through the graph arcs or edges, in the sense that its parents' patterns are less specific than its pattern and its parents' measures encompass its measures. Thus our structure for aggregating N-dimensional data is organized primarily on the basis of N-dimensional patterns.

Each node in the partial-order database will be associated with one of these patterns and linked to those nodes (patterns) to which it most directly relates. From the point of view of one of these nodes, the direct link(s) upwards connect to its parent(s), also called "immediate predecessors", while the direct link(s) downwards connect to its children, also called "immediate successors."The result of searching with a query pattern will be to locate the position of that pattern within the database. If the pattern is exactly matched to an existing node in the partial-order, that node can easily provide the answer. However, should the query match no existing node, then the answer will derive from the successors to the query pattern. These nodes and links together form a graph to fully embody all stored fact data, all the summary/index nodes, and the relationship between them. This enables a single topologically-ordered search, following these links, to locate the answer to any query relying only upon said graph structure, the pattern-comparison test, the type hierarchy, and simple arithmetic.

The basic method of partial-order search has been known for some time. Robert Levinson, in his PhD Thesis, Technical Report AI-85-05, University of Texas at Austin, 1985, presents these methods as applied to the problem of classification. However, prior art methods are slow and must make many comparison tests to navigate through the nodes at the top of the partial-order. What is needed is some means to accelerate search in the average case.

Objects and Advantages

Accordingly, several objects and advantages of the present invention are:
1. to provide a method, in support of analysis of multi-dimensional data, that is efficient in time and in the amount of data storage required;
2. to scale well: to be efficient across a broad variation in the number of dimensions, number of categorical types, and number of data points;
3. to efficiently support the "children-of" operator required by the OLAP Council's APB-1 benchmark;
4. to be able to accommodate a form of fuzzy pattern matching;
5. to be able, with some constraints, to operate correctly and efficiently even when the type hierarchy contains instances of multiple-inheritance;
6. to be adaptable in that it can either work in conjunction with an existing data warehouse system, or it can work in conjunction with an existing analysis tool, or it can be used as the basis for building a new system or analysis tool.

In general, the object of this invention is not merely to perform better than prior art multi-dimensional database systems for the typical application of today, but to perform well while providing the ability to expand into new areas of symbolic data analysis. Additional objects and advantages will be set forth in the description which follows, and in part will be obvious from the description and with the accompanying drawings, or may be learned from the practice of this invention.

SUMMARY

In accordance with these objects, the present invention provides means to create and search a partial-order database and provide aggregate measures such as Count, Sum, Average and Standard Deviation. My data analysis engine does not navigate by testing one dimension at a time against some index or steering node, but rather by testing all dimensions simultaneously via pattern comparison. The engine does not need a full set of pre-computed summary nodes to operate, since it can efficiently combine data from many nodes to provide an answer to a query. (For example, in running the 0.1% density APB-1 benchmark, it needed only one summary node for every 39 data points.) Moreover, since the structure built by the present invention is suitable for "crawling", it may be useful as the basis for a data-mining system.

One aspect of this invention is a set of data structures to help translate, and navigate the type hierarchy for each categorical dimension. Another aspect is a set of data structures for the summary and data nodes which, taken collectively, form the partial-order database.

In the preferred embodiment of the present invention, another set of data structures enable search operations in the partial-order to be accelerated in their earliest phase, herein called phase zero. This acceleration provides predecessors of the query pattern, to be used in starting phase one. (In the absence of phase zero, phase one would start from Top, also called epsilon, the most general node, which is the root of the partial-order.)

One aspect of the present invention is phase one of the search operation, which performs a topological search downward to locate the immediate predecessors to the query pattern. In the case where this set contains one node, and that node has the exact match of the query pattern, phase two may not be necessary. Another aspect of this invention is phase two of the search operation, which continues down from the set of immediate predecessors and locates as many successors to the pattern as are required to answer the query.

Yet another aspect of the present invention is sometimes called phase three, and is used to insert the node into its previously discovered position in the database. Another aspect of this invention modifies its behavior to include the "children-of" operator. Another aspect of this invention modifies its behavior to permit multiple-inheritance in part of the type hierarchy. Another aspect of this invention modifies its behavior to include fuzzy pattern matching. This latter ability could help data analysts by allowing them to extract information from heterogeneous data sources, or by allowing them to query the system using a natural language.

BRIEF DESCRIPTION OF THE DRAWINGS

FIG. 7A shows data structures to support translation and navigation of the type hierarchy.

FIG. 7B illustrates an alternate (non-preferred) implementation of two data structures.

FIG. 7C shows data structures to support the seeding of the database, and seed-based acceleration of searches.

FIG. 7D shows data structures to support the hash-based acceleration of searches, and insertion of nodes at and between two hash levels.

DETAILED DESCRIPTION
Description—FIGS. 1–2—High-level Overview

The invention will be described primarily as a method (algorithm plus data structures) to be implemented within a data processing computer system. However, persons skilled in the art will recognize that the present invention may be manufactured and distributed in the form of a computer program, software library, state control specification for a programmable logic device, logic embedded within a computational device, a specification in some formal language intended for transformation into computational behavior, or any combination thereof.

Figure 1A:
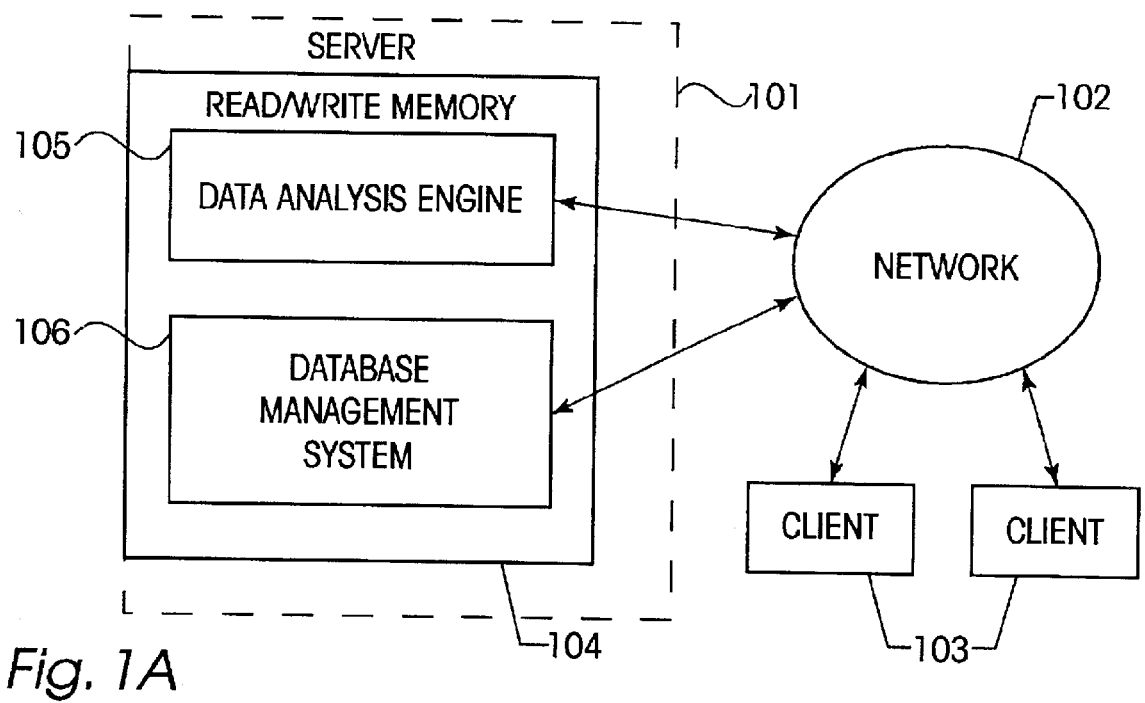
FIG. 1A is a high-level diagram showing how the data analysis engine may be positioned within a networked server computer system.

FIG. 1A depicts the invention as a data-analysis engine 105 existing within a Read/Write memory 104 of a computer Server system 101. Server 101 is connected through a network 102 to any number of Clients 103, to facilitate interactive analysis, or to present the results of data analysis. In this type of architecture, an analysis engine 105 would typically connect to a DBMS (Database Management System) 106 hosted (at least in part) on the same computer.

Figure 1B:
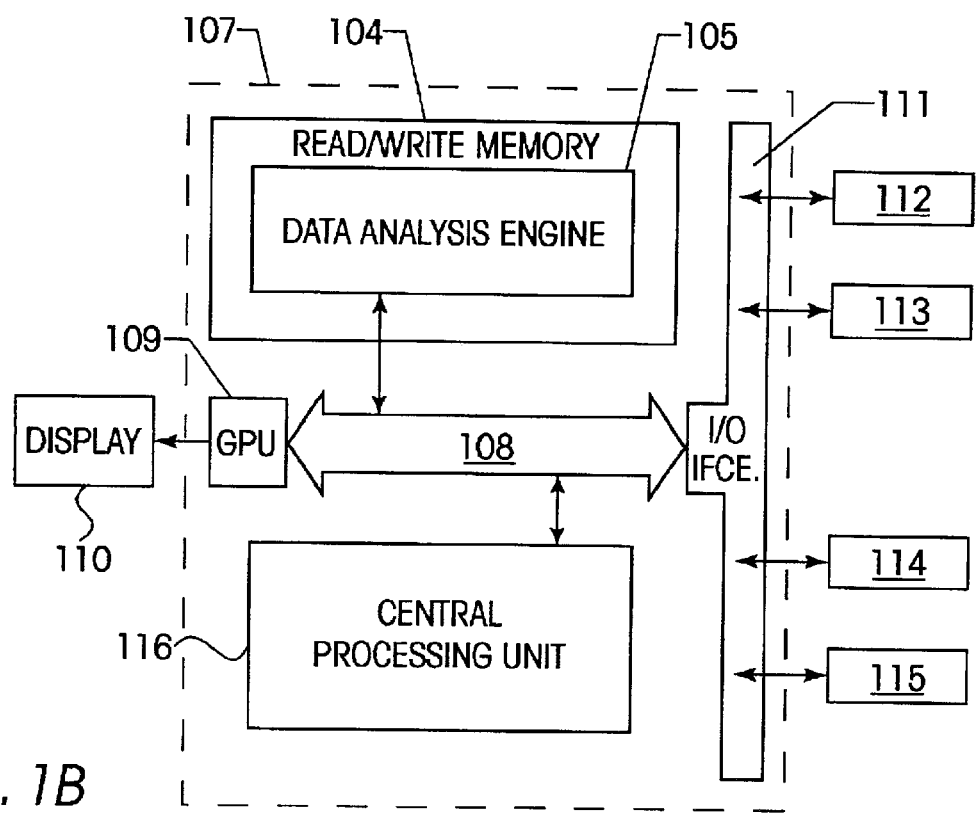
FIG. 1B is a high-level diagram showing how the data analysis engine may be positioned within a typical desktop computer system.

FIG. 1B shows the present invention as data-analysis engine 105 embodied within an individual-workstation computer system 107 and Read/Write memory 104. System 107 typically contains an internal bus 108 to which connects a central processor 116, a graphics processor 109, several I/O interfaces 111, and optionally a tertiary-storage unit 117. Graphics processor 109 is usually connected to a display device 110. I/O interfaces 111 connect to some or all of the following: a pointing device 112, a keyboard device 113, a microphone 114 for voice input, and a network link 115.

The invention provides means to create and search a database in which data are organized in typical multi-dimensional fashion: those dimensions representing measurements such as population, cost or revenue are used to collet aggregate statistics. The other dimensions are usually categorical, with each dimension having its own hierarchy of types. FIG. 2B shows a portion of a multidimensional database 200, having a dimension TIME 202, a dimension PRODUCT 208, and a dimension CUSTOMER 212. A type hierarchy proceeds from general to specific, and is organized like trees. Thus TIME 202 is seen to contain a year 1995 203, which in turn contains: a quarter 95Q1 204, a quarter 95Q2 205, a quarter 95Q3 206, and a quarter 95Q4 207. Similarly, PRODUCT 208 contains a TRUCK TIRES 209, which in turn contains a ATX75R15 210, a ATX80R16 211, and so on. CUSTOMER 212 contains a GM 213, which itself contains a GM-PLANT 12 214, a GM-PLANT 18 215, and so on. Some dimensions will have more "levels" of detailed types than others. For example PRODUCT 208 may have just two levels of detail (as shown in FIG. 2B), but TIME 202 may have three levels of detail if each quarter is broken down into its constituent months.

Figure 2A:
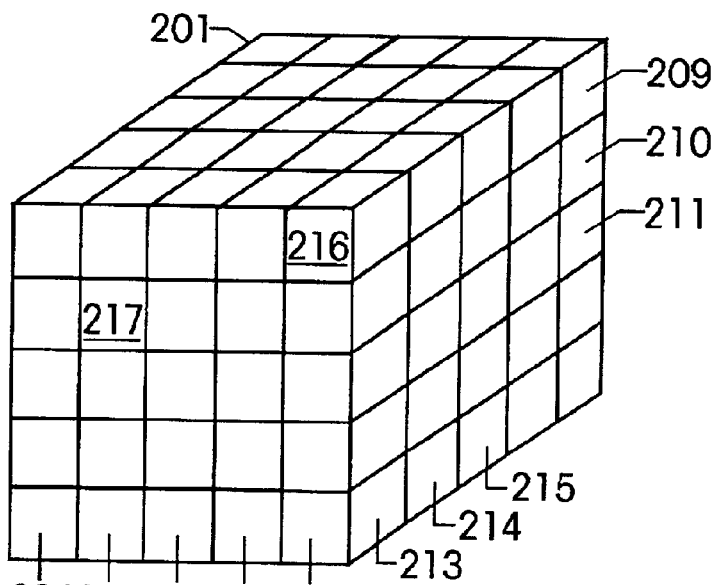
FIG. 2A illustrates a typical data cube with three dimensions.
Figure 2B:
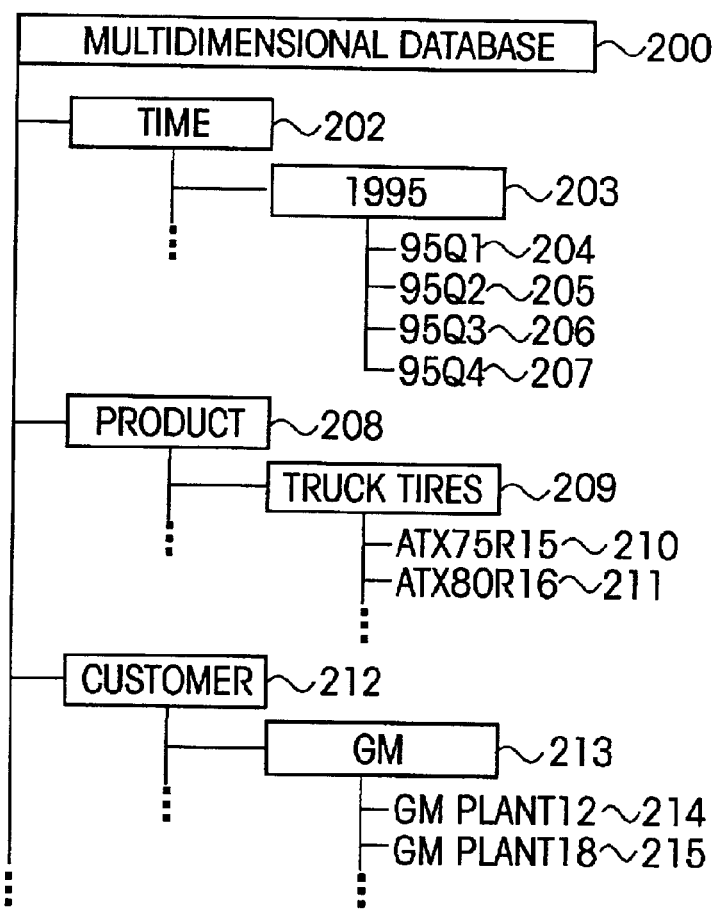
FIG. 2B is a chart showing a portion of the type hierarchy which corresponds to the cube in FIG. 2A.

FIG. 2A shows a portion of the sample multi-dimensional database (MDD) represented as a 3-dimensional data cube 201, as is common in online analytical processing (OLAP) applications. Along the bottom it is shown that the leftmost vertical slice in cube 201 includes in the TIME dimension 95Q1 204, and that to its right are slices for 95Q2 205, 95Q3 206, 95Q4 207, and year 1995 203. At the upper right it is shown that the topmost slice of cube 201 has in the PRODUCT dimension TRUCK TIRES 209, and that below it are slices for ATX75R15 210, ATX80R16 211, and other unspecified types of truck tire. Finally, along the bottom-to-right edge, it is show that slices taken from side-to-side include in the CUSTOMER dimension GM 213, GM-PLANT12 214, GM-PLANT18 215, and so on. Thus a sub-cube 216 at the top right front represents the data for 1995/TRUCK TIRES/GM, and therefore summarizes the larger cube; all of the other little sub-cubes represent subsets (children) of sub-cube 216. For example, a sub-cube 217 on the front face, near the top and left, contains the data for 95Q2/ATX75R15/GM.

Figure 3:
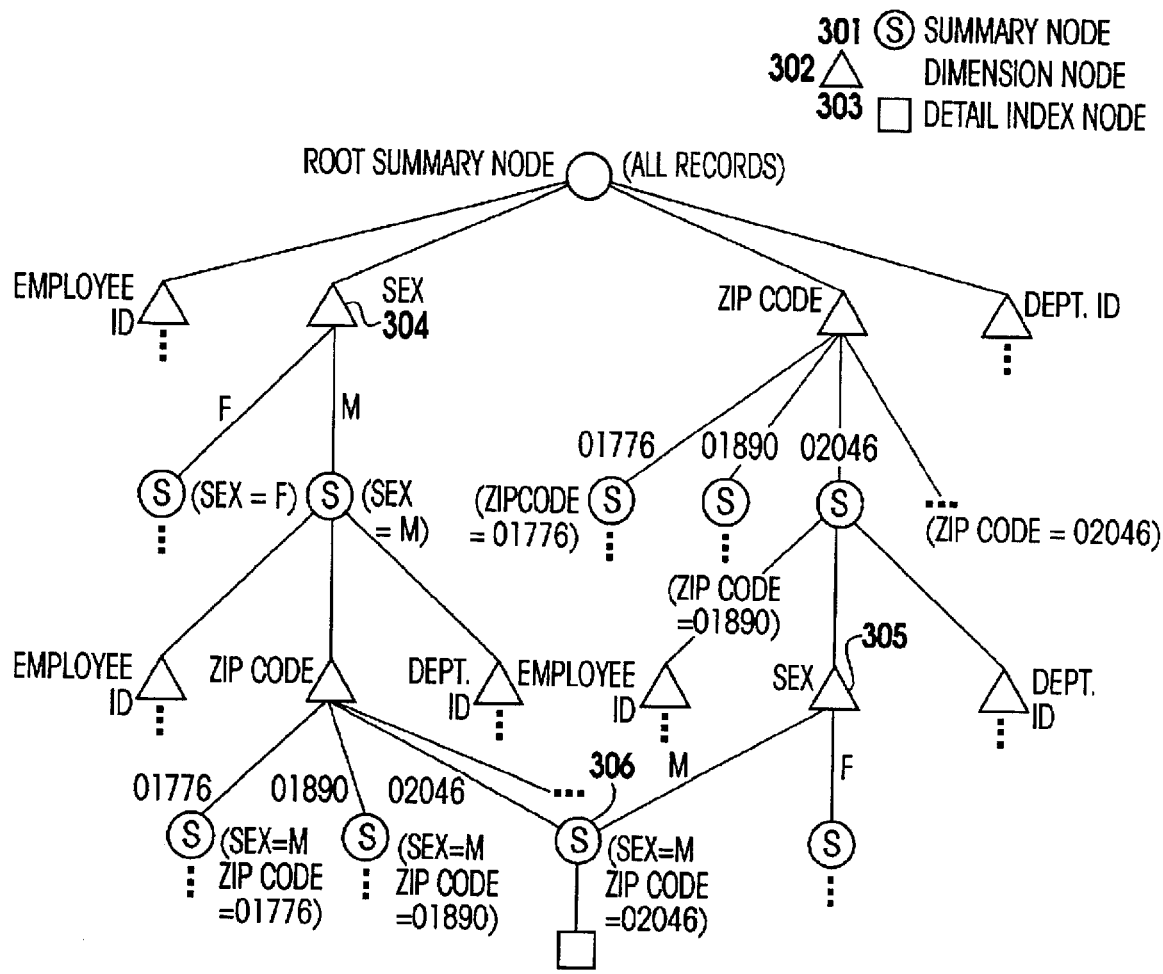
FIG. 3 shows a graphical representation of a prior art multi-dimensional search tree.
Figure 4A:
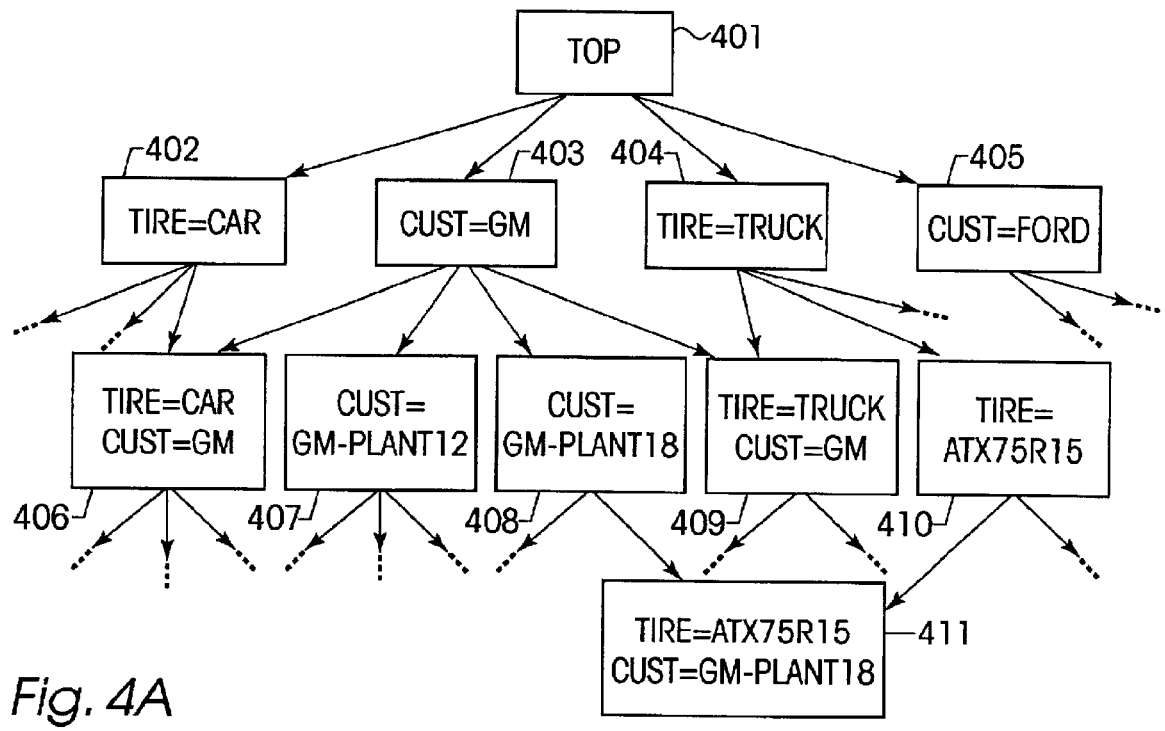
FIG. 4A shows a portion of a partial-order graph for the data categories depicted in FIG. 2.

Description—FIGS. 3–4A—Partial-Order Structures

FIG. 3 shows a prior art multi-dimensional summary search tree, as disclosed in U.S. Pat. Nos. 5,257,365 (1993), 5,404,512 (1995), and 5,404,513 (1995) all to Powers et al.. Three distinct kinds of node are used: a Summary node 301, a Dimension node 302, and a Detail Index node 303. Dimension nodes are used to guide the search, which proceeds by testing one dimension at a time. Since paths are provided for all possible orderings of dimensions, the number of Dimension nodes increases exponentially as more dimensions are added. As shown in the drawing, a test for SEX may occur before (304) or after (305) the test for ZIPCODE, yet both can lead to the same destination, a node 306.

My method and system provides a more efficient means, since it can represent the data in FIG. 3 by use of Summary nodes alone. That is, no Dimension nodes or Detail Index nodes are required. Moreover, since the present invention performs on-the-fly aggregation whenever necessary, good performance is obtainable with fewer summary nodes.

FIG. 4A shows a small section of a partial-order database which corresponds to the data schema presented in FIG. 2B.

Each node in this graph contains a pattern that specifies the type in one or more dimensions, except for a Top node 401 which has an empty pattern and therefore "contains" the entire database. Node 401 has relational linkage with every node stored in the database, but the only links stored are those to its immediate successors (children) which in this example are a node 402, a node 403, a node 404, and a node 405; these children are said to exist at level one of the partial-order because each has no path upward to node 401 longer than one link.

As seen in FIG. 4A, level one nodes (402–5) in a typical partial-order database have patterns with only one dimension set to a value; that value will be general in the sense that it's position in the type hierarchy is near the root of the tree. Such nodes are sometimes called "atoms" as they are building blocks for larger patterns, as shown in how a node 406 is a child of nodes 402 and 403. Likewise, a node 409 and a node 411 are seen to derive from combining the patterns of the parents. In contrast, a node 407 and a node 408 each derive from a single parent, node 403; each of their patterns represents a specialization of GM created by moving down the type hierarchy of the CUST dimension. Similarly, a node 410 was created by specialization in the TIRE dimension.

Figure 6:
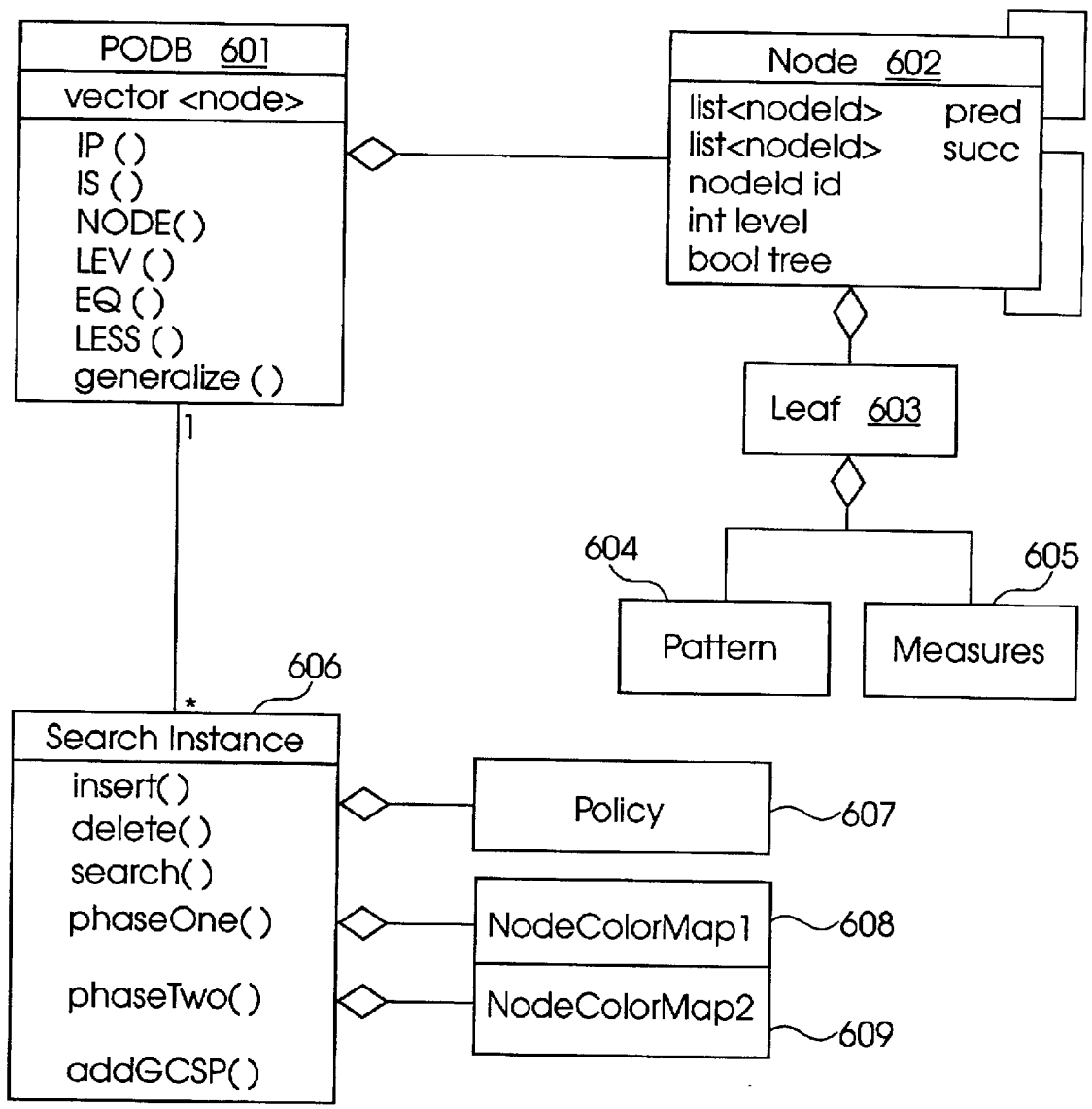
FIG. 6 is a simplified UML class diagram for the partial-order database; it does not include the data structures supporting the type hierarchy and acceleration.

Description—FIGS. 6–7—Software Structures

In FIG. 6, a basic diagram of the essential software objects is presented, in a simplified version of a UML Class Diagram, for a portion of the preferred embodiment. A partial-order database (PODB) 601 contains a vector array that stores a multiplicity of a Node 602. A Leaf 603 contains a Pattern structure 604 and a Measures structure 605. Among the purposes of Node 602 is to embody the partial-order graph via linkages, hence it contains a list of all immediate predecessors (IPs) and a list of all immediate successors (ISs). To support search and statistical operations, Node 602 also contains its nodeId, its level, a "tree" flag to indicate that its statistical measures are safe to combine with those of other nodes, and one Leaf 603.

The PODB 601 includes a set of small functions that help provide access to a Node: these are IP( ) and IS( ) which, when passed a nodeId, allow reference to that node's IP and IS lists, NODE( ) which returns a reference to that node itself, and LEV( ) which returns that node's level. The other functions depicted for PODB 601 adapt the database to whatever form of pattern is being used: EQ(A, B) tests for equivalence of two patterns, LESS(A, B) tests whether the pattern A includes pattern B (whether A=B or A<B), and generalize(A, B) returns a pattern C such that C<A and C<B.

PODB 601 may have any number of searches in progress simultaneously, each search being embodied in a Search Instance (SI) 606. Every SI 606 contains, either directly or through reference, a Policy 607 to help tailor the search. Functions within SI 606 include: delete( ) which removes a node from PODB 601; search( ) which has the dual purpose of finding an existing node in the database (or creating a new node), and of assembling statistics for that node; insert( ) which places a newly created node into the database; and addGCSP( ) which, under certain conditions, makes use of generalized to create a new summary pattern which is then inserted into the database to help improve performance. Still in FIG. 6, we see that SI 606 includes a phaseOne( ), and this shall contain a NodeColorMap1 608 to assist that part of the search operation. SI 606 also includes a phaseTwo( ), and this shall contain a NodeColorMap2 609 to assist that part of the search operation. NodeColorMaps help implement graph traversal by tracking counts, bit-vector intersection, and visitation without changing the state of any node; thus they allow simultaneous searches to occur in the database.

For the purpose of disclosing this invention, the preferred computer language is C++ with elements of the Standard Template Library. FIG. 7A shows data structures that support translation and navigation of the type hierarchy. For each dimension used, there is a related pair of structures 701 containing a typesUsed counter 702 and a Type hash map 703. When a pattern needs conversion from text to integers, Type maps 703 are used for each dimension being translated. For each dimension, there is also a related pair of data structures 704 containing a thLev map 705 which (given the type number) will return the "level" of any type, and a Promote map 706 which (given a type number and requested level) will return the value of that type promoted to that level, or a failure indicator should the request be impossible. For example, in FIG. 2B, asking Promote map 706 for TIME dimension 202 to promote 95Q2 to level 1—would return the type number for year 1995. Such navigation between levels in a type hierarchy has many uses, including support of the LESS( ) function that compares two patterns.

FIG. 7C shows structures which support seeding the database and the use of seed-based search acceleration. Actual operation is described later, but for each dimension we have a seedLim 712, a levelOne list 713, a levelTwo list 714, and a seedLUT map 711. Additionally, there is a seedLUT2 map 710.

FIG. 7D shows array hashSubUpSpec 720 which contains information controlling the creation of intermediate nodes for insertion between the levels at which the two hash tables operate. The preferred embodiment includes a hash table H1 721 and a hash table H2 722. These hash tables contain entries for nodes in the database whose patterns comply with the type levels specified in an array accelLims 723. There is, for each dimension, an integer level" pertaining to H1 721, and an integer "level" pertaining to H2 722. The level number zero indicates the ALL or TOP position in the type hierarchy, and usually indicates that this dimension can be ignored.

FIG. 7B shows an alternate embodiment of a Promote map 706' and an array accelLim 723'. This version was used in an early test of the invention against the APB-1 benchmark, and its simplicity may be useful for purposes of discussion. MAX_FIELDS is the number of fields (dimensions) expected in each (fixed-length) pattern. The preferred embodiment uses vector<> arrays in order to provide greater flexibility, and also to reduce the memory needed for Promote.

Operation

Figure 8:
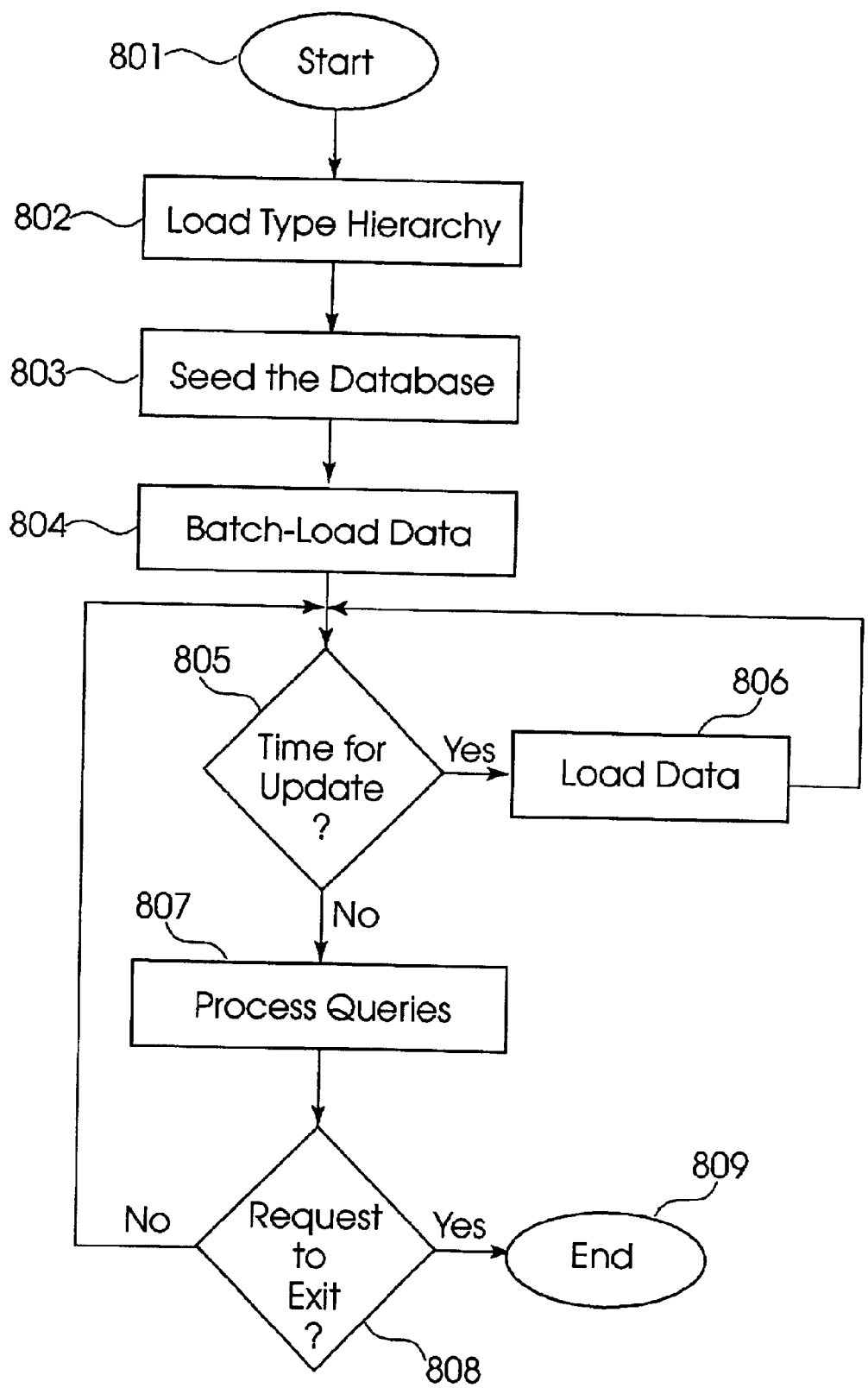
FIG. 8 is a flowchart of an operation sequence for the partial-order database.

FIG. 8 is a flowchart presenting an overview of one possible embodiment of this invention's operational sequencing. This version describes creating, then using, the partial-order database, but does not address the possibility of persistence of the partial-order structure on secondary storage. A Start 801 is followed by a Load Type Hierarchy operation 802 wherein the type tree for each dimension is read-in and translated into some data structures 702, 703, 705, 706, 713, and 714 previously described for FIG. 7. Then follows a Seed the Database operation 803 which, using structures 712–714, places seed nodes into the database, storing their nodeIds into lookup tables 710 and 711. Next follows a Batch-Load Database operation 804 wherein the partial-order is populated with multi-dimensional data. The database is now ready for data analysis operations. As shown in a decision 805 and a Load Data operation 806, and in related flow paths, new data may be loaded incrementally any time that query processing is suspended. (In the current embodiments of the invention, the act of inserting a new node into the partial-order is not "multi-thread safe.") In a step 807 queries of the database may be processed serially or in parallel until a decision 808 is made to bring all operations to an End 809.

Loading into the Type Hierarchy

The embodiment of the Load Type Hierarchy operation described herein was designed to read text files describing each dimension in the APB-1 benchmark, in which each line traces a "leaf" type up the tree to its level-one ancestor. The actual implementation differs from the pseudo code, which follows in Table 1, primarily in its use of recursion to complete processing of all types on the input line before the "for" loop assigning to the Promote table. (Note that the criteria for deciding which dimensions contribute to the levelTwo list can be altered from that which is shown, without departing from the substance of this invention.)

TABLE 1

Pseudo-code for Load Type Hierarchy 802

```
Foreach dimension dim {
    initialize Promote to zero across all levels
    Foreach input line
        Foreach field with a new (unseen) typestring,
            with level lev {
            Type [dim] [typeString] =
                myType = ++typesUsed[dim];
            ThLev [dim] [myType] = lev;
            Promote[dim] [lev] [myType] = myType;
            for( ltmp= lev − 1; ltmp> 0; ltmp-- )
                Promote [dim] [ltmp] [myType] =
                    ancestor type at level ltmp;
            if( lev == 1 )
                levelOne[dim].push_back(myType);
            else if( lev == 2
                && this dimension uses >4 levels )
                levelTwo[dim].push_back(myType);
        }
}
```

Loading of Seeds

Seeding the database with small patterns is necessary to create a topology that may be searched efficiently. (Otherwise most of the data would connect directly to the Top node, and no useful pre-aggregation could occur.) At the same time these nodes are added, they are recorded in lookup tables as one means of accelerating database search. The key used for hash table seedLUT2 710 is a hash upon two dimension numbers and the types within them for the current pattern. (Alternate methods of performing lookup still fall within the scope of this invention.) Loading of seeds is described in Table 2.

TABLE 2

Pseudo-code for Seed the Database 803

```
Foreach dimension dim { // seed atoms with Top as IP
    if( seedLim[dim] > 0 )
        insert new nodes each with a pattern from levelOne
    if( seedLim[dim] > 1 )
        insert new nodes each with a pattern from levelTwo
}
Foreach dimension dim { // seed 2-D patterns
    Foreach 2-way combination of dims whose seedLim > 0 {
        // using the patterns from each respective
        // levelOne list
        create a node from each unique pair of patterns
        insert into database, linked to its atom parents
        store nodeId in the seedLUT2 hash table
    }
}
```

Loading Data

Data may be loaded whenever there are no queries running. There is no significant difference attached to the order in which records are loaded; nor does Batch-load Data step 804 need a separate method than incremental Load Data step 806. In the preferred embodiment, a node is accessed through its id number, a positive integer starting from 0 (which represents the Top node). Each new node receives the next available number, which corresponds to its position in an array (simple, or vector<>, or cache, or the like). If an attempt to insert a data item finds that a node already exists for the same pattern, the data's Measures element 605 will accumulate into the existing node, and no new node id will be issued.

The PODB 601 provides a wrapper around the insert( ) function of Search Instance 606, to track the next available nodeId and to implement the two acceleration methods. (This allows Search Instance to be generic—largely decoupled from the specific version of the database.) The acceleration method tried first is hash lookup using H1. If that fails because the pattern being inserted has (in one or more dimensions) a type that is too abstract—having a level less than that contained in accelLims[0] for that dimension—then hashed-acceleration is abandoned and seed-acceleration is used. This PODB-level insert function is presented as Table 3, in which tryLev and hashLeaf serve as outputs from the tryAccel( ) function.

TABLE 3

Pseudo-code for Loading Data Item from its Node form

```
SearchInstance si (myPolicy);
NodeList parents;
Node* np = NODE(nUsed);
short tryLev[MAX_FIELD];
HashLeaf hashLeaf;
int nix, h1val =
    tryAccel(H1, accelLims[0], hashLeaf, tryLev, pattern);
if( h1val < 0 ) // too abstract, try seed-accel
    retryAccel (tryLev, hashLeaf.pattern, parents);
else {
    if( h1val > 0 ) // H1 hit
        parents.push_back(h1val);
    else { // H1 miss, do extra insert
        Node* np1 = NODE(++nUsed);
        np1->setPat (hashLeaf.pattern);
        retryAccel (tryLev, hashLeaf.pattern, parents);
        si.insertLeaf (nUsed, &parents);
        H1 [hashLeaf] = nUsed;
        parents.clear( ); parents.push_back (nUsed);
    }
    int h2val =
        tryAccel (H2, accelLims[1], hashLeaf, tryLev, pattern);
    if( h2val > 0 ) { // H2 hit, replace parents
        parents.clear( ); parents.push_back(h2val);
    }
    else if( h2val == 0 ) { // H2 miss, so insert and use
        Node* np2 = NODE(++nUsed);
        np2->setPat (hashLeaf.pattern);
        si.insertLeaf(nUsed, &parents);
        H2[hashLeaf] = nix = nUsed;
        if( IP(nUsed)->size( ) < 2 ) {
            create and insert nodes between new H2 node and
                its H1 parent, using Promote and the control
                values from hashSubUpSpec
        }
        parents.clear( ); parents.push_back(nix);
    }
}
```

The tryAccel( ) function creates a new pattern by promoting each field of the input pattern to the level required by accelLims. The new pattern is copied to the hashLeaf parameter, and its levels are copied to the tryLev array parameter. If the new pattern results in a hash table "hit", then a nodeId is returned. Otherwise a −1 return value indicates that the input pattern could not be promoted, or a 0 value indicates a hash table "miss". The retryAccel( ) function, given an input pattern and its levels, finds seed nodes which are ancestors of the pattern, and places them into the parent list. First it finds 1-D seed nodes using seedLUT lookup table 711 for each dimension whose input level is non-zero. Then it locates 2-D seed nodes using the seedLUT2 lookup table 710.

Processing Queries

The PODB 601 provides a wrapper function around the search( ) function of Search Instance (SI) 606. When combined with translation for its input (the query) and its output (the results), the wrapper function doQuery( ) embodies the Process Queries step 807. doQuery( ) is nearly identical to the loading function in Table 3, except that no insertion is performed, and any hash table miss results in giving up the search because there is no data to match the query. Before invoking the search( ) function, the SI can be passed an array of flags specifying those dimensions for which the "children-of" function is requested. After the search, Si's areChildren( ) and getChildren( ) provide access to the results of a "children-of" query; but for a normal query, results are obtained from Measures member 605 of the node returned by the search.

Search Instance's search( ) and insert( )

Search Instance 606 contains functions to search the partial-order, to insert a node, and (optionally) to delete a node. The wrapper function insertSeed( ), when passed a node and an IP list, will copy that list into the node's pred list before calling the normal insert( ) function; thus it bypasses phaseone and phaseTwo of the normal search. The wrapper function insertLeaf( ), when passed a node and an init-list, will call phaseOne (node, init-list) and, if the node is not found in the database, insert it (setting its "tree" flag true); thus it bypasses phaseTwo of the normal search.

The insert( ) function, operating on a node N, is comprised of these steps:
1. remove all links between nodes in N's IP set and N's IS set;
2. add links from N's IPs down to N, and from N's ISs up to N;
3. using the highest level among N's IPs, call adjustLevel (N, ++level);
4. accumulate N's statistical Measures into each of its IPs The adjustLevel (N, level) function tests whether level> N's level and, if so, assigns that new level to N then calls adjustLevel (S, level+1) foreach node S in N's IS list.

The search( ) function, given a query node Q and an init-list of known predecessors, will call phaseOne (Q, init-list) then, if an exact match N for Q was found, returns a pointer to N. Otherwise, it prepares an initList2, calls phaseTwo (Q, initList2), then returns a pointer to Q. Each element in initList2 is a pair<NodeId, 1<<ix++> such that each IP of Q is recorded along with one bit (temporarily) unique to it, up to a fixed limit such as 31 elements. (The limit reserves one bit to act as a VETO flag.)

Note that when performing a "children-of" query, if phaseOne( ) finds an exact match then the search( ) function must call childrenOf (N) before returning the pointer to N-because "children-of" data is always generated on-the-fly and never stored in the node. The childrenOf( ) function is easily derived by one skilled in the art, after study of phaseTwo( ).

Phase One of Search

The purpose of phaseOne( ) is to find the IP set for the node Q, which is either being processed for insertion into the database, or is representing a query. Two principles are followed in this invention in order to keep the solution "generic", or efficient across a wide variety of applications:

1. restrict the number of calls to the pattern compare function LESS( ), since it might have high cost when patterns are complex;
2. follow links rather than doing a full topological scan, since a partial-order database usually widens as the level goes deeper.

The preferred version of phaseOne( ) was, to some extent, presented in *The Art of Computer Programming*, Vol. 1, pages 258–265, by Donald Knuth, 1968, published by Addison-Wesley. A node N in the partial-order will not be tested by comparison with Q unless all of N's IPs have already been found to be predecessors of Q. An implementation of this method can be derived from Table 4.

Figure 4B:
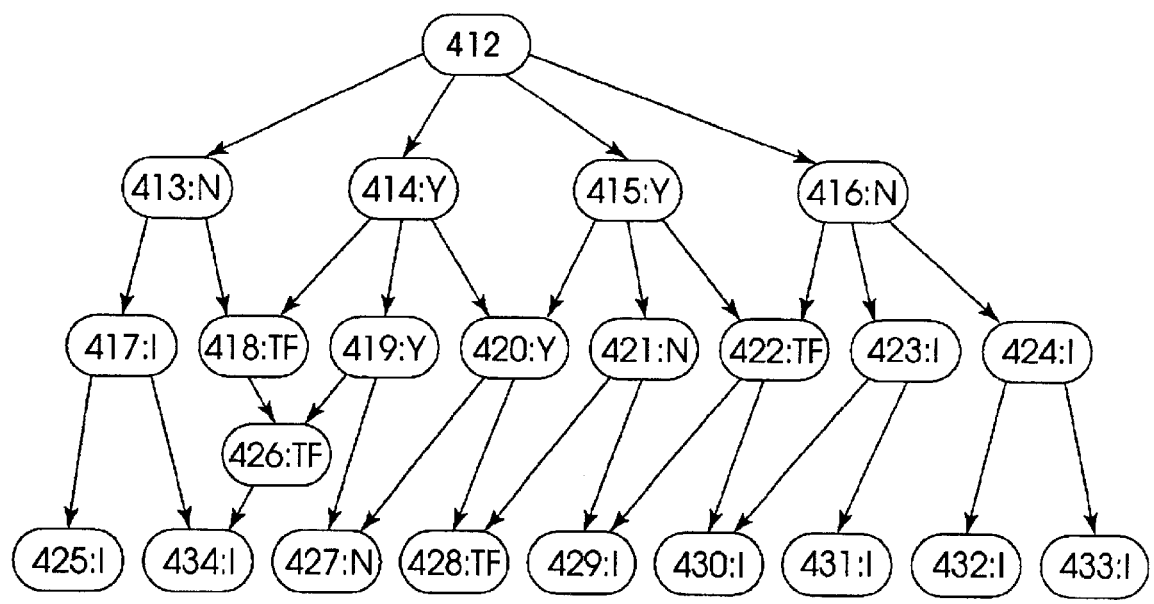
FIG. 4B shows a portion of a generic partial-order graph, with the indicators 'Y', 'N', 'TF', and 'I' to help illustrate the progression of phase one of the search operation.

Referring to FIG. 4B, in the absence of acceleration, phaseOne( ) begins with the fact that a Top node 412 must be a predecessor of Q. Therefore each of node 412's children (a set of nodes 413–416) are then compared to Q, with a result as indicated in the drawing: "N"=a failed compare, "Y"=a passed compare, "TF"=no compare done because the tally failed (not all of N's IP's were predecessors of Q), and "I"=ignored because this node was never placed into the ColorMap1. The effect of following the two principles stated above is seen in level-two of the partial-order (a set of nodes 417–424) where only 3 of 8 nodes get compared, and in level-three (a set of nodes 425–433) where 6 of 9 nodes are ignored. (A node 434 is included at level-four, to demonstrate that a node's level is determined by its longest path to Top.)

TABLE 4

Pseudo-code for phaseOne ( ) and its NodeColorMap

```
SearchInstance::phaseOne(NodeId Q, NodeList& initList) {
    NodeList w, P = initList;
    NodeId   X;
    NodeCM1  cm1(w, initList, policy);
    while( !w.empty( ) ) {
        X = w.front( ); w.pop_front( );
        if( LESS(X, Q) ) {
            P.push_back(X);
            cm1.enlistChiidren (X);
        }
    }
    Process P, copying only immediate preds to IP(Q)
    if( IP(Q) has only one node X && EQ(Q, X) )
        return NODE(X);
    return 0;
}
NodeCM1::NodeCM1 (NodeList& workList, NodeList& initList)
    : w(workList) {
    foreach N in initList, enlistChildren(N)
}
NodeCM1::enlistChildren(NodeId N) {
    foreach S in IS(N), countDown(S)
}
NodeCM1::countDown(NodeId X) {
    // use hash_map to discover nodes to put on worklist
    if( X is in count[ ] )
        --count[X];
    else
        count[X] = IP(X)->size( ) - 1;
    if( count[X] == 0 )
        w.push_back(X);
}
```

Phase Two of the Search

Figure 5A:
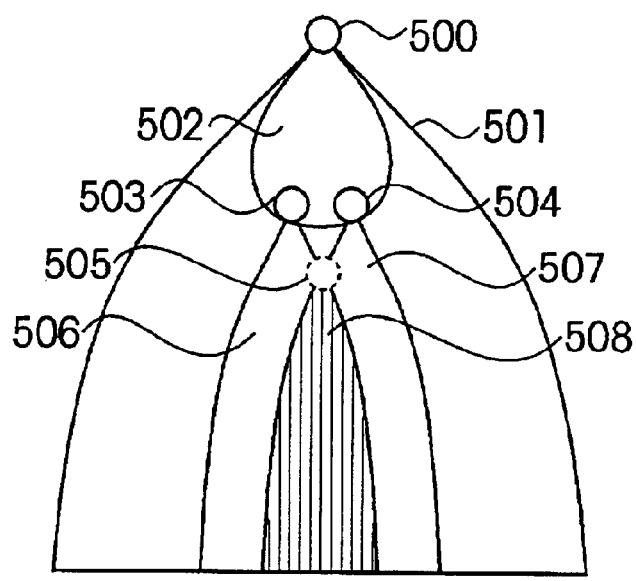
FIG. 5A is a diagram to illustrate how the IP (immediate predecessor) nod es found in a phase one search are used to find the scope of the phase two search.

PhaseTwo( ) is used to discover the IS set for a node and to compile statistical measures associated with that node. It moves through the partial-order in an manner similar to phaseOne( ), but must use some type of priority queue to assure that nodes are examined in topological order. Referring to FIG. 5A, we see a Top node 500 and a partial-order database 501 descending from it. Phase one of the search has already examined an area 502, and discovered that a node Q 505 has exactly two IPs (a node 503 and a node 504). A downward closure 506 consists of all successors of Node 503, and a downward closure 507 consists of all successors of Node 504. Node 505 is not contained in database 501. However, its successor set within database 501 must be contained in focus area 508, which consists of the intersection of closures 506 and 507.

Figure 5B:
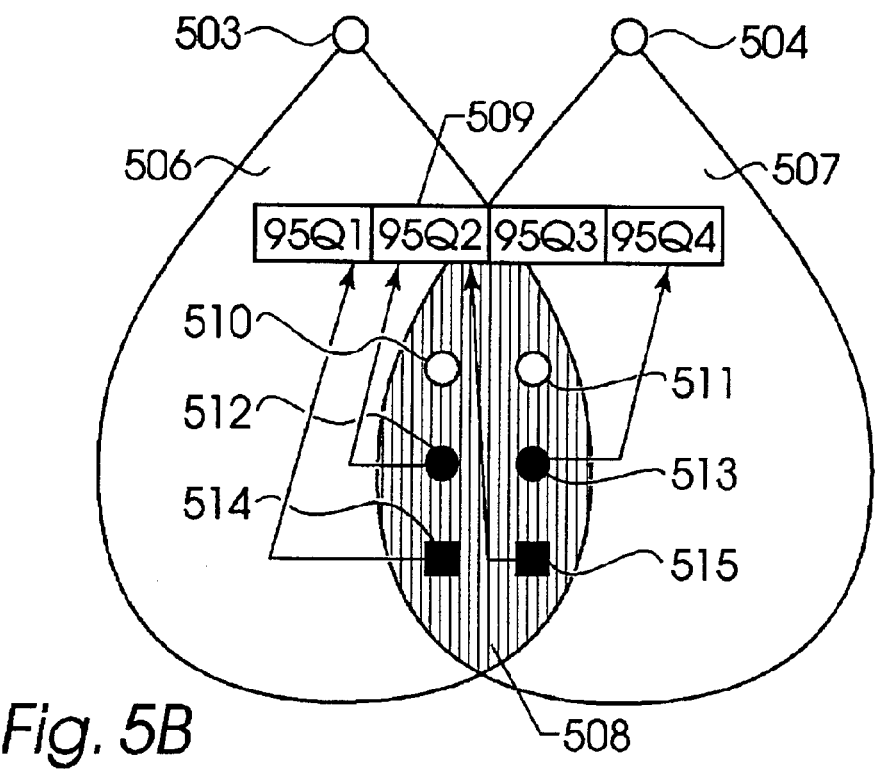
FIG. 5B illustrates a variation of phase two, wherein the preferred embodiment of the invention implements the "children-of" function through use of an array of accumulators.

The generation of a downward closure of the IPs of Q, and of an intersection, is created on-the-fly by phaseTwo( ) and its NodeColorMap2 helper, as revealed in Table 5. Included therein are also details for embodiment of the "children-of" function, which augments the collection of statistics into node Q with a set of sub-cube statistics, whose collection is shown in FIG. 5B. An accumulator array 509 is used to collect children-of details during phase two. In this example, details were requested for the TIME dimension; since Q had year 1995 in its pattern, the children of 1995 are the targets of the accumulation. The search discovers six successors of Q: a node 510 and a node 511 have 1995 in their pattern and thus are rejected; a node 512 has 95Q2 in its pattern and so is added into the corresponding cell of accumulator 509; a node 513 has 95Q4 in its pattern and so is added into the corresponding cell of accumulator 509; a node 514 is from January 1995 and so is promoted to 95Q1 and then accumulated; a node 515 is from April 1995 and so is promoted to 95Q2 and then accumulated. The preferred implementation of accumulator 509 is as a hash table. Thus in Table 5, NodeColorMap2 needs only a single data structure— MLH[ ]—no matter how many dimensions are requested for "children-of" details. At the end of the search, the hash table can be iterated to recover the accumulated data.

TABLE 5

Pseudo-code for phaseTwo ( ) and its NodeColorMap

```
Node* SearchInstance::phaseTwo (NodeId Q, NodeList& initList) {
    NodeId      X;
    short       proLev [MAX_FIELD] = { 0 };
    NodeCM2     cm2(w, initList, policy);
    if children-of requested {
        foreach dimension dim where requested
            proLev[dim] = 1 + ThLev[dim] [NODE(Q)->pattern(dim)];
        copy proLev and Q's pattern to cm2
    }
    while( X = cm2.getFront ( ) ) {
        if( cm2.match(X) && LESS(Q, X) )
            put X into IS(Q) and set X's VETO bit in cm2
        if( cm2.isVeto(X) && TREE(X) && cm2.childSafe(X) )
            accumulate X's measures into Q
        else
            cm2.enlistChildren(X);
    }
    Copy cm2's child data into SI's childList
    return NODE(Q);
}
NodeCM2::NodeCM2 (PairList& initList, Policy& pol)
    :policy(pol), matchVal(0) {
    foreach pair P in initList {
        matchVal |= p.second;
        setVec(p.first, p.second);
    }
}
NodeCM2::enlistChildren(NodeId N) {
    foreach S in IS(N), setVec(S, color[N])
}
NodeCM2::setVec(NodeId X, Bits bitVal)
    // use hash_map to discover intersection
    if( X is in color[ ] )
        color[X] |= bitVal;
    else {
        color[X] = bitVal;
        place X into priority queue based on level
```

TABLE 5-continued

Pseudo-code for phaseTwo ( ) and its NodeColorMap

```
    }
}
NodeId NodeCM2::getFront ( ) {
    pop and return a node from priority queue,
    else return 0 if queue is empty
}
bool NodeCM2::childSafe(NodeId N) {
    if children-of requested {
        copy N's pattern and data to Lear leaf
        foreach dimension dim
            if children-of required {
                if the pattern[dim] level < required
                    return 0;
                else
                    promote pattern[dim] type to required level
            } else
                set pattern[dim] = Query's pattern[dim]
        MLH[leaf].add(leaf's data); // hashes on pattern
    }
    return 1;
}
```

Our partial-order structure is tree-like only in some places. If a node A has a sibling B (that is, LESS(A, B) and LESS(B, A) are both false) then any attempt of phaseTwo( ) to accumulate directly from A and from B runs the risk of getting an incorrect result. (For example, consider basic set theory and the measure Count: to accumulate A and B one should take Count (A intersect B) and subtract it from the sum Count(A)+Count(B). The formulas get more complicated as more sets are included in the accumulation.) Hence, if phaseTwo( ) does not find the Tree flag set, it will defer accumulation until it finds nodes further down in the successor set which do have this flag asserted. (Note that the preferred embodiment constructs a partial-order such that there is a region of nodes whose pattern's types' levels are at or below the accelLims and are safe to combine; thus abstract queries can be answered efficiently. Because of this, and to ensure proper operation of acceleration, extreme caution is advised if addGCSP( ) is allowed to insert new patterns into this region of the database.)

Alternate Embodiment of Node Storage

Figure 9:
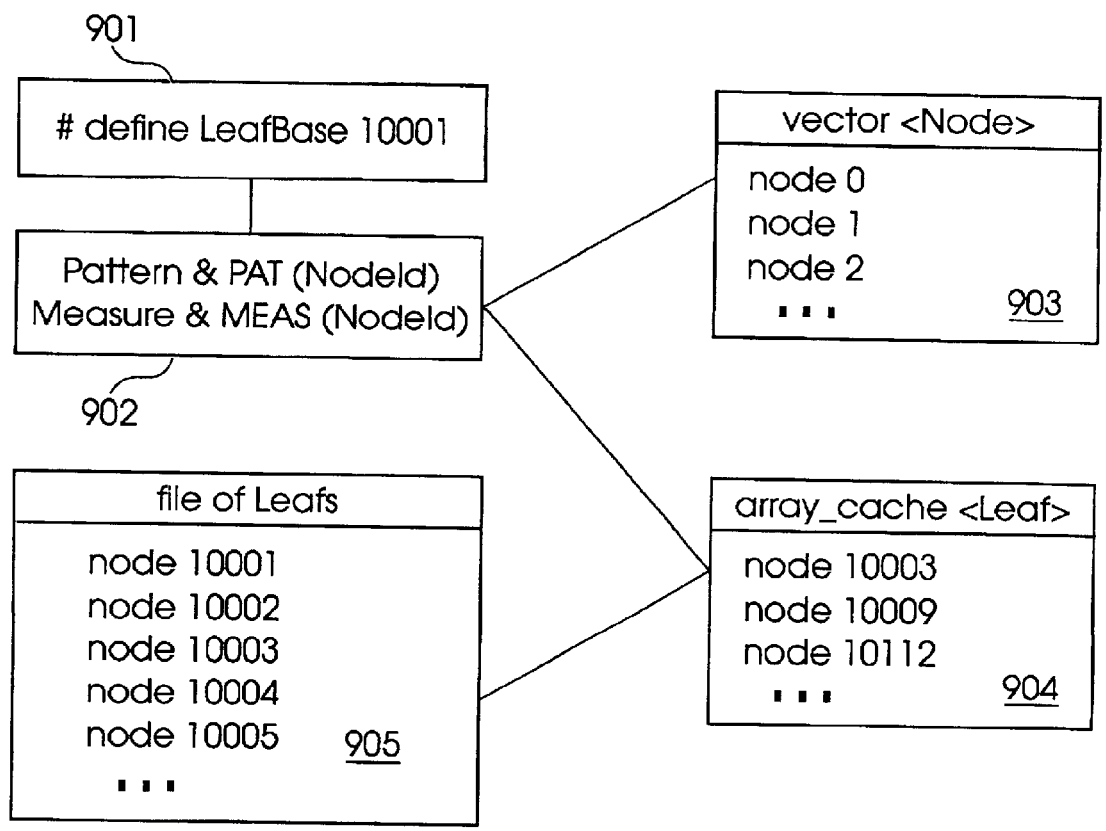
FIG. 9 is an alternate embodiment for node storage and access.

If the present invention is applied to traditional OLAP, greater efficiency may be achieved by storing the detail-level data items as Leafs rather than as full-fledged Nodes. Advantages include: a reduction in storage space, and the ability to access Leafs through a software cache so that they needn't all be in main memory at the same time. In FIG. 9, 1 present one such arrangement, wherein a pair of accessor support functions 902 can test a NodeId against some condition like a boundary 901, to correctly locate an element from either a Node vector 903 or a Leaf cache 904. (Thus, SearchInstance 606 can remain generic—unaware of the split between Nodes and Leafs.) Cache 904 provides a window into a backing store (or regular) file 905 containing data for all the Leafs in the database. Such a cache is easily constructed by one skilled in the art, if the suggestion is followed to make the Leaf data structure a fixed size.

Alternate Embodiment—Fuzzy Pattern-Matching

Uses of uncertainty management techniques for associative retrieval from a database of conceptual graphs is discussed by S. H. Myaeng in his paper, "On uncertainty handling in plausible reasoning with conceptual graphs", in *Conceptual Structures: Current Research and Practice,* 1992, published by Ellis Horwood Ltd. He proposes two levels of uncertainty handling—a macro-level for analyzing cumulative evidence by combining the plausibility of a target CG's predecessors, and a micro-level for quantifying the degree to which the query and target CGs match. Thus the macro-level is an additional step in screening a target node before allowing a comparison, while the micro-level is an integral part of the comparison operation which should now return a plausibility measure for whatever relation it tests for.

A simple adaptation of the present invention is possible if new versions of LESS( ) and EQ( ) are provided for Myaeng's micro-level. For phase one, if all predecessors of the target are also predecessors of the query, and if the combined assessment reaches the threshold, then F_LESS( ), the fuzzy version of LESS( ), is called. In addition, and optionally, for phase two an extra call to F_LESS( ) can be used to obtain an adjustment factor to use in scaling the data measures during accumulation. The adaptations are minor, as can be seen from comparing Table 6 with contents of earlier tables. Note that FCN( ) combines probabilities, or fuzzy values, in accordance with the policy established by the implementer, database administrator, or data analyst. I recommend choosing a simple function like MIN, MAX, or AVERAGE.

TABLE 6

Pseudo-code changes for Fuzzy Pattern-Matching

```
SearchInstance::phaseOne(NodeId Q, NodeList& initList) {
    float fv;
    ...
        if( (fv= F_LESS(X, Q) ) >= policy.cutoff1 ) {
            P.push_back(X);
            cm1.enlistChildren(X, fv);
        }
    ...
    if( IP(Q) has only one node X
        && F_EQ(Q, X) >= policy.cutoff3 )
    ...
}
NodeCM1::enlistChildren(NodeId N, float fv) {
    foreach S in IS(N), countDown(S, fv)
}
NodeCM1::countDown(NodeId X, float fv) {
    if( X is in count[ ] ) {
        --count[X];
        faccum [X] = FCN(faccum[X], fv)
    } else {
        count[X] = IP(X)->size ( ) – 1;
        faccum[X] = fv;
    }
    if( count[X] == 0 && faccum[X] >= policy.cuttoff0 )
        w.push_back(X);
}
SearchInstance::phaseTwo(NodeId Q, NodeList& initList) {
    float af; // adjustment factor for scaling measures
    ...
    if( cm2.match(X) && F_LESS(Q, X) >= policy.cutoff2 )
        put X into IS(Q) and set X's VETO bit in cm2
    if( cm2.isVeto(X) && TREE(X) && (af= F_LESS(Q, X) )
        && cm2.childSafe(X) )
        accumulate X's measures into Q, scaled by af
    ...
}
```

CONCLUSIONS, RAMIFICATIONS, AND SCOPE

Accordingly, the data analysis system and method of the invention provides an efficient, yet flexible, partial-order solution suitable for use in data-mining and OLAP applications, whether by itself or in conjunction with a database management system. Optional features include: an acceleration means placed at the start of a search operation; support for fuzzy pattern-matching; and support for a "children-of" operator.

Although the present invention stores a full N-dimensional pattern at each node and makes full N-dimensional comparison tests, one skilled in the art would easily recognize that a sparse-vector form which skips null fields is a simple variation, and may be preferable when N is large. Likewise, one could add information to the edges of the directed graph, for purposes such as reducing pattern comparison costs, without departing from the spirit of the invention. Likewise, the scope of this invention includes applications where one or more dimensions are scalar, and thus an abstract pattern would include ranges.

Description contains many specificities, these should not be construed as limitations on the scope of the invention, but as merely providing illustrations of some of the presently preferred embodiments. Many other variations are possible. For example, this invention may be adapted for processing several forms of metadata in order to fill its structures for the type hierarchy. Or this invention may be used in applications not mentioned above, such as risk assessment or medical diagnosis.

Accordingly, the scope of this invention should be determined not by the embodiments illustrated, but by the appended claims and their legal equivalents.

I claim:

1. A method for supporting data analysis through use of a partial-order structuring of multi-dimensional data and aggregated measurements stored in computer memory, and use of a pattern-comparison means, said pattern-comparison means having the ability to compare two patterns across a multiplicity of dimensions so as to determine whether the first pattern is more-general-than the second pattern, comprising the steps of:

(a) loading of metadata defining the type hierarchy;
(b) transforming multi-dimensional fact data into a plurality of nodes, said nodes containing at least a pattern part and a measures part, and said pattern part having the ability to store a multiplicity of dimension values simultaneously;
(c) loading of said data nodes into a partial-order structure providing a functional representation of a rooted directed-acyclic graph whose arcs embody an ordering by the relationship established by the pattern-comparison means;
(d) loading of a plurality of additional nodes into said partial-order structure, wherein said additional nodes contain a pattern part that is more general than any pattern contained in said data nodes;
(e) aggregating the measures part from said data nodes into the measures part of said additional nodes;
(f) performing on-demand aggregation, facilitated by said partial-order structure, in response to a query for which insufficient pre-aggregated data is currently stored.

2. The method of claim 1, further comprising the step of:

(g) topologically-ordered associative searching of said partial-order structure using pattern-comparison against a query pattern, so as to return aggregate data specific to said query pattern by:
  1. returning pre-aggregated data, should said query pattern be present in a node of said partial-order structure;
  2. returning aggregation data assembled on-the-fly by means of said query pattern's virtual position in the partial-order, should said query pattern not be present in a node of said partial-order structure.

3. The method of claim 1, further comprising the steps of:

(h) assembling a list of nodes through use of associative look-up means separate from said partial-order structure, said nodes being predecessors of a query pattern, as part of means for accelerating associative search;

(i) returning a null result for the query, in the case that said list is empty;

(j) proceeding with a topologically-ordered associative search of said partial-order structure using pattern-comparison against a query pattern, so as to return aggregate data specific to said query pattern, in the case that said list is non-empty, said associative search employing accelerating means.

4. The method of claim 1, further comprising the step of:

(k) traversing said partial-order structure, while processing data contained therein so as to separately accumulate data for specializations of a query pattern, said specializations along any number of dimensions being controlled by means of a children-of specification accompanying the query, and said accumulation being facilitated by means of pattern-promotion.

5. The method of claim 1, wherein said pattern-comparison means is able to return a fuzzy-valued test result.

6. A system of logic circuitry and computational instructions for supporting data analysis through use of a partial-order structuring of multi-dimensional data and aggregated measurements stored in computer memory, and use of a pattern-comparison means, said pattern-comparison means having the ability to compare two patterns across a multiplicity of dimensions so as to determine whether the first pattern is more-general-than the second pattern, comprising:

(a) means for loading of metadata defining the type hierarchy;

(b) means for transforming multi-dimensional fact data into a plurality of nodes, said nodes containing at least a pattern part and a measures part, and said pattern part having the ability to store a multiplicity of dimension values simultaneously;

(c) means for loading of said data nodes into a partial-order structure providing a functional representation of a rooted directed-acyclic graph whose arcs embody an ordering by the relationship established by the pattern-comparison means;

(d) means for loading of a plurality of additional nodes into said partial-order structure, wherein said additional nodes contain a pattern part that is more general than any pattern contained in said data nodes;

(e) means for aggregating the measures part from said data nodes into the measures part of said additional nodes;

(f) means for performing on-demand aggregation, facilitated by said partial-order structure, in response to a query for which insufficient pre-aggregated data is currently stored.

7. The system of claim 6, further comprising:

(g) means for topologically-ordered associative searching of said partial-order structure using pattern-comparison against a query pattern, so as to return aggregate data specific to said query pattern by:

1) returning pre-aggregated data, should said query pattern be present in a node of said partial-order structure;

2) returning aggregation data assembled on-the-fly by means of said query pattern's virtual position in the partial-order, should said query pattern not be present in a node of said partial-order structure.

8. The system of claim 6, further comprising:

h. means for assembling a list of nodes through use of associative look-up means separate from said partial-order structure, said nodes being predecessors of a query pattern, as part of means for accelerating associative search;

i. means for returning a null result for the query, in the case that said list is empty;

j. means for proceeding with a topologically-ordered associative search of said partial-order structure using pattern-comparison against a query pattern, so as to return aggregate data specific to said query pattern, in the case that said list is non-empty, said associative search employing accelerating means.

9. The system of claim 6, further comprising:

(k) means for traversing said partial-order, while processing data contained therein so as to separately accumulate data for specializations of a query pattern, said specializations along any number of dimensions being controlled by means of a children-of specification accompanying the query, and said accumulation being facilitated by means of pattern-promotion.

10. The system of claim 6, wherein said pattern-comparison means is able to return a fuzzy-valued test result.

* * * * *